United States Patent
Noyes

(10) Patent No.: US 9,598,286 B2
(45) Date of Patent: Mar. 21, 2017

(54) METHODS AND SYSTEMS FOR FORMING AMMONIA AND SOLID CARBON PRODUCTS

(71) Applicant: Seerstone LLC

(72) Inventor: Dallas B. Noyes, Provo, UT (US)

(73) Assignee: Seerstone LLC, Provo, UT (US)

( * ) Notice: Subject to any disclaimer, the term of this patent is extended or adjusted under 35 U.S.C. 154(b) by 10 days.

(21) Appl. No.: 14/414,364

(22) PCT Filed: Mar. 15, 2013

(86) PCT No.: PCT/US2013/000078
§ 371 (c)(1),
(2) Date: Jan. 12, 2015

(87) PCT Pub. No.: WO2014/011206
PCT Pub. Date: Jan. 16, 2014

(65) Prior Publication Data
US 2015/0147259 A1    May 28, 2015

Related U.S. Application Data

(60) Provisional application No. 61/671,464, filed on Jul. 13, 2012.

(51) Int. Cl.
| | | |
|---|---|---|
| *D01F 9/12* | (2006.01) | |
| *C01B 31/02* | (2006.01) | |
| *C01C 1/04* | (2006.01) | |
| *B82Y 30/00* | (2011.01) | |
| *B82Y 40/00* | (2011.01) | |

(52) U.S. Cl.
CPC .......... *C01B 31/0233* (2013.01); *B82Y 30/00* (2013.01); *B82Y 40/00* (2013.01); *C01B 31/02* (2013.01); *C01B 31/0226* (2013.01); *C01C 1/04* (2013.01); *C01C 1/0405* (2013.01)

(58) Field of Classification Search
CPC .................................................. C01B 31/0226
See application file for complete search history.

(56) References Cited

U.S. PATENT DOCUMENTS

| | | |
|---|---|---|
| 1,478,730 A | 12/1923 | Brownlee |
| 1,735,925 A | 11/1929 | Jaeger |
| 1,746,464 A | 2/1930 | Fischer et al. |
| 1,964,744 A | 7/1934 | Odell |
| 2,404,869 A | 7/1946 | Sorrentino |
| 2,429,980 A | 11/1947 | Allinson |
| 2,440,424 A | 4/1948 | Wiegand et al. |
| 2,745,973 A | 5/1956 | Rappaport |
| 2,796,331 A | 6/1957 | Kauffman et al. |
| 2,800,616 A | 7/1957 | Becker |
| 2,811,653 A | 10/1957 | Moore |
| 2,819,414 A | 1/1958 | Sherwood et al. |
| 2,837,666 A | 6/1958 | Linder |
| 2,976,433 A | 3/1961 | Rappaport et al. |
| 3,094,634 A | 6/1963 | Rappaport |
| 3,172,774 A | 3/1965 | Diefendorf |
| 3,249,830 A | 5/1966 | Adany |
| 3,378,345 A | 4/1968 | Bourdeau et al. |
| 3,634,999 A | 1/1972 | Howard et al. |
| 3,714,474 A | 1/1973 | Hoff |
| 3,846,478 A | 11/1974 | Cummins |
| 3,905,748 A | 9/1975 | Cairo et al. |
| 4,024,420 A | 5/1977 | Anthony et al. |
| 4,126,000 A | 11/1978 | Funk |
| 4,197,281 A | 4/1980 | Muenger |
| 4,200,554 A | 4/1980 | Lauder |
| 4,602,477 A | 7/1986 | Lucadamo et al. |

(Continued)

FOREIGN PATENT DOCUMENTS

| | | |
|---|---|---|
| EP | 0945402 A1 | 9/1999 |
| EP | 2186931 A1 | 5/2010 |
| EP | 2404869 A1 | 1/2012 |
| JP | 339339 B2 | 10/2002 |
| JP | 3339339 B2 | 10/2002 |
| JP | 2004517789 A | 6/2004 |
| JP | 2004360099 A | 12/2004 |
| JP | 2005075725 A | 3/2005 |
| JP | 2005532976 A | 11/2005 |
| JP | 2007191840 A | 8/2007 |
| WO | 0230816 A1 | 4/2002 |
| WO | 03018474 A1 | 3/2003 |
| WO | 2004048263 A1 | 6/2004 |
| WO | 2004096704 A3 | 11/2005 |
| WO | 2005103348 A1 | 11/2005 |

(Continued)

OTHER PUBLICATIONS

Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).

(Continued)

*Primary Examiner* — Stuart Hendrickson
(74) *Attorney, Agent, or Firm* — TraskBritt P.C.

(57) ABSTRACT

Methods of concurrently forming ammonia and solid carbon products include reacting a carbon oxide, nitrogen, and a reducing agent at preselected reaction conditions in the presence of a catalyst to form a solid carbon product entrained in a tail gas mixture comprising water and ammonia; separating entrained solid carbon product from the tail gas mixture; and recovering water and ammonia from the tail gas mixture. Systems for forming ammonia and solid carbon products from a gaseous source containing carbon oxides include mixing means for mixing the gaseous source with a reducing agent, reactor means for reacting at least a portion of the gaseous source with the reducing agent in the presence of a catalyst to produce the solid carbon products and a tail gas mixture comprising the ammonia, and solid separation means for separating the solid carbon products from the tail gas mixture.

16 Claims, 1 Drawing Sheet

(56) References Cited

U.S. PATENT DOCUMENTS

| | | |
|---|---|---|
| 4,628,143 A | 12/1986 | Brotz |
| 4,663,230 A | 5/1987 | Tennent |
| 4,710,483 A | 12/1987 | Burk et al. |
| 4,725,346 A | 2/1988 | Joshi |
| 4,727,207 A | 2/1988 | Paparizos et al. |
| 4,746,458 A | 5/1988 | Brotz |
| 4,900,368 A | 2/1990 | Brotz |
| 5,008,579 A | 4/1991 | Conley et al. |
| 5,021,139 A | 6/1991 | Hartig et al. |
| 5,082,505 A | 1/1992 | Cota et al. |
| 5,122,332 A | 6/1992 | Russell |
| 5,133,190 A | 7/1992 | Abdelmalek |
| 5,149,584 A | 9/1992 | Baker et al. |
| 5,187,030 A | 2/1993 | Firmin et al. |
| 5,260,621 A | 11/1993 | Little et al. |
| 5,396,141 A | 3/1995 | Jantz |
| 5,413,866 A | 5/1995 | Baker et al. |
| 5,456,897 A | 10/1995 | Moy et al. |
| 5,526,374 A | 6/1996 | Uebber |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,624,542 A | 4/1997 | Shen et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,726,116 A | 3/1998 | Moy et al. |
| 5,747,161 A | 5/1998 | Iijima |
| 5,780,101 A | 7/1998 | Nolan et al. |
| 5,859,484 A | 1/1999 | Mannik et al. |
| 5,877,110 A | 3/1999 | Snyder et al. |
| 5,910,238 A | 6/1999 | Cable et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,713,519 B2 | 3/2004 | Wang et al. |
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Margrave et al. |
| 6,843,843 B2 | 1/2005 | Takahashi et al. |
| 6,855,301 B1 | 2/2005 | Rich et al. |
| 6,855,593 B2 | 2/2005 | Andoh |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | Moy et al. |
| 7,094,385 B2 | 8/2006 | Beguin et al. |
| 7,094,386 B2 | 8/2006 | Resasco et al. |
| 7,094,679 B1 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,212,147 B2 | 5/2007 | Messano |
| 7,214,360 B2 | 5/2007 | Chen et al. |
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,718,283 B2 | 5/2010 | Raffaelle et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |

(56) References Cited

U.S. PATENT DOCUMENTS

| | | |
|---|---|---|
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,919,065 B2 | 4/2011 | Pedersen et al. |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,282 B2 | 9/2011 | Choi et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 8,679,444 B2 * | 3/2014 | Noyes ............ B82Y 30/00 423/445 R |
| 2001/0009119 A1 | 7/2001 | Murray et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2003/0059364 A1 | 3/2003 | Prilutskiy |
| 2003/0147802 A1 | 8/2003 | Smalley et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0032330 A1 | 2/2006 | Sato |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0141346 A1 | 6/2006 | Gordon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0080605 A1 | 4/2007 | Chandrashekhar et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaelle et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |

(56) References Cited

U.S. PATENT DOCUMENTS

| | | |
|---|---|---|
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0298071 A9 | 12/2011 | Spencer et al. |
| 2012/0034150 A1 | 2/2012 | Noyes |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2013/0154438 A1 | 6/2013 | Tan Xing Haw |
| 2014/0021827 A1 | 1/2014 | Noyes |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071846 A1 | 3/2015 | Noyes |
| 2015/0071848 A1 | 3/2015 | Denton et al. |
| 2015/0078982 A1 | 3/2015 | Noyes |

FOREIGN PATENT DOCUMENTS

| | | |
|---|---|---|
| WO | 2006003482 A3 | 8/2006 |
| WO | 2007086909 A3 | 11/2007 |
| WO | 2007139097 A1 | 12/2007 |
| WO | 2007126412 A3 | 6/2008 |
| WO | 2009011984 A1 | 1/2009 |
| WO | 2006130150 A3 | 4/2009 |
| WO | 2009122139 A1 | 10/2009 |
| WO | 2009145959 A1 | 12/2009 |
| WO | 2010047439 A1 | 4/2010 |
| WO | 2010087903 A1 | 8/2010 |
| WO | 2010120581 A1 | 10/2010 |
| WO | 2011009071 A1 | 1/2011 |
| WO | 2011020568 A1 | 2/2011 |
| WO | 2011029144 A1 | 3/2011 |
| WO | 2010146169 A3 | 4/2011 |
| WO | 2010124258 A3 | 5/2011 |
| WO | 2011053192 A2 | 5/2011 |
| WO | 2013090274 | 6/2013 |
| WO | 2013158155 | 10/2013 |
| WO | 2013158155 A1 | 10/2013 |
| WO | 2013158156 | 10/2013 |
| WO | 2013158156 A1 | 10/2013 |
| WO | 2013158157 A1 | 10/2013 |
| WO | 2013158158 A1 | 10/2013 |
| WO | 2013158159 A1 | 10/2013 |
| WO | 2013158160 A1 | 10/2013 |
| WO | 2013158161 A1 | 10/2013 |
| WO | 2013158438 | 10/2013 |
| WO | 2013158439 | 10/2013 |
| WO | 2013158441 | 10/2013 |
| WO | 2013162650 A1 | 10/2013 |
| WO | 2014011206 | 1/2014 |
| WO | 2014011206 A1 | 1/2014 |
| WO | 2014011631 | 1/2014 |
| WO | 2014011631 A1 | 1/2014 |
| WO | 2014085378 A1 | 6/2014 |

OTHER PUBLICATIONS

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

Baker, B. A. and G. D. Smith "Metal Dusting in a Laboratory Environment—Alloying Addition Effects," Special Metals Corporation, undated.

Baker, B. A. and G. D. Smith, "Alloy Solutions to Metal Dusting Problems in the PetroChemical Industry," Special Metals Corporation, undated.

Bogue, Robert, Powering Tomorrow's Sensor: A Review of Technologies—Part 1, Sensor Review, 2010, pp. 182-86, vol. 30, No. 3.

Cha, S. I., et al., "Mechanical and electrical properties of cross•linked carbon nanotubes," Carbon 46 (2008) 482-488, Elsevier, Ltd.

Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journai/1998/98_APL_72_3282-ChengH M.pdf).

Chun, Changmin, and Ramanarayanan, Trikur A., "Metal Dusting Corrosion of Metals and Alloys," 2007.

(56) References Cited

OTHER PUBLICATIONS

Chung, U.C., and W.S. Chung, "Mechanism on Growth of Carbon Nanotubes Using CO-H2 Gas Mixture," Materials Science Forum vols. 475-479 (2005) pp. 3551-3554.
Dai, et al., "Single-wall nanotubes produced by metal-catalyzed disproportionation of carbon monoxide," Chemical Physics Letters 260 (1996) 471-475, Elsevier.
Dresselhaus et al., Carbon Nanotubes Synthesis, Structure, Properties, and Applications. 2001, pp. 1-9, Springer.
Garmirian, James Edwin, "Carbon Deposition in a Bosch Process Using a Cobalt and Nickel Catalyst," PhD Dissertation, Massachusetts Institute of Technology, Mar. 1980, pp. 14-185.
Grobert, Nicole, "Carbon nanotubes—becoming clean," Materials Today, vol. 10, No. 1-2, Jan.-Feb. 2007, Elsevier, pp. 28-35.
Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.
Hiraoka, Tatsuki, et al., "Synthesis of Single- and Double-Walled Carbon Nanotube Forests on Conducting Metal Foils," 9 J. Am. Chem. Soc. 2006, 128, 13338-13339.
Holmes, et al.; A Carbon Dioxide Reduction Unit Using Bosch Reaction and Expendable Catalyst Cartridges; NASA; 1970; available at https://archive.org/details/nasa_techdoc_19710002858.
Huang, Z.P., et al., "Growth of highly oriented carbon nanotubes by plasma-enhanced hot filament chemical vapor deposition," Applied Physics Letters 73:3845-3847, Dec. 28, 1998.
"Inconel® alloy 693—Excellent Resistance to Metal Dusting and High Temperature Corrosion" Special Metals Product Sheet, 2005.
Kavetsky et al., Chapter 2, Radioactive Materials, Ionizing Radiation Sources, and Radioluminescent Light Sources for Nuclear Batteries, Polymers, Phosphors, and Voltaics for Radioisotope Microbatteries, Edited by Bower et al., 2002, pp. 39-59, CRC Press.
Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.
Lal, Archit, "Effect of Gas Composition and Carbon Activity on the Growth of Carbon Nanotubes," Masters Thesis, University of Florida, 2003.
Manasse et al., Schottky Barrier Betavoltaic Battery, IEEE Transactions on Nuclear Science, vol. NS-23, No. 1, Feb. 1976, pp. 860-70.
Manning, Michael Patrick, "An Investigation of the Bosch Process," PhD Dissertation, Massachusetts Institute of Technology, Jan. 1976.
Unknown author, "Metal Dusting," unknown publisher, undated.
Unknown author, "Metal Dusting of reducing gas furnace HK40 tube," unknown publisher, undated.
Muller-Lorenz and Grabke, Coking by metal dusting of steels, 1999, Materials and Corrosion 50, 614-621 (1999).
Nasibulin, Albert G., et al., "An essential role of C02 and H20 during single-walled CNT synthesis from carbon monoxide," Chemical Physics Letters 417 (2005) 179-184.
Nasibulin, Albert G., et al., "Correlation between catalyst particle and single-walled carbon nanotube diameters," Carbon 43 (2005) 2251-2257.
Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina-nanofibers-and-composites).
Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.
Ruckenstein, E. and H.Y. Wang, "Carbon Deposition and Catalytic Deactivation during C02 Reforming of CH4 over Co/?-Al203 Catalysts," Journal of Catalysis, vol. 205, Issue 2, Jan. 25, 2002, pp. 289-293.
Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.
SAE 820875 Utilization of Ruthenium and Ruthenium-Iron Alloys as Bosch Process Catalysts. Jul. 19-21, 1982.
SAE 911451 Optimization of Bosch Reaction, Jul. 15-18, 1991.
Singh, Jasprit, Semiconductor Devices, an Introduction, 1994, pp. 86-93, 253-269.
Singh, Jasprit, Semiconductor Devices, Basic Principles, Chapter 6, Semiconductor Junctions with Metals and Insulators, 2001, pp. 224-244, Wiley.
Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.
Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).
Szakalos, P., "Mechanisms and driving forces of metal dusting," Materials and Corrosion, 2003, 54, No. 10, pp. 752-762.
Tsai, Heng-Yi, et al., "A feasibility study of preparing carbon nanotubes by using a metal dusting process," Diamond & Related Materials 18 (2009) 324-327, Elsevier.
Tse, Anthony N., Si-Au Schottky Barrier Nuclear Battery, A Thesis submitted to the Faculty in partial fulfillment of the requirement for the degree of Doctor of Engineering, Thayer School of Engineering, Dartmouth College, Hanover, New Hampshire, Nov. 1972, pp. 31-57.
Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.
Wei, et al. "The mass production of carbon nanotubes using a nano-agglomerate fluidized bed reactor: A multiscale space-time analysis," Powder Technology 183 (2008) 10-20, Elsevier.
XP-002719593 Thomson abstract.
Zeng, Z., and Natesan, K., Relationship between the Growth of Carbon Nanofilaments and Metal Dusting Corrosion, 2005, Chem. Mater. 2005, 17, 3794-3801.
PCT International Search Report and Written Opinion, PCT/US2013/000078, dated Jul. 8, 2013.
International Preliminary Report on Patentability, for International Application No. PCT/US2013/000078, dated Jan. 22, 2015, 6 pages.

\* cited by examiner

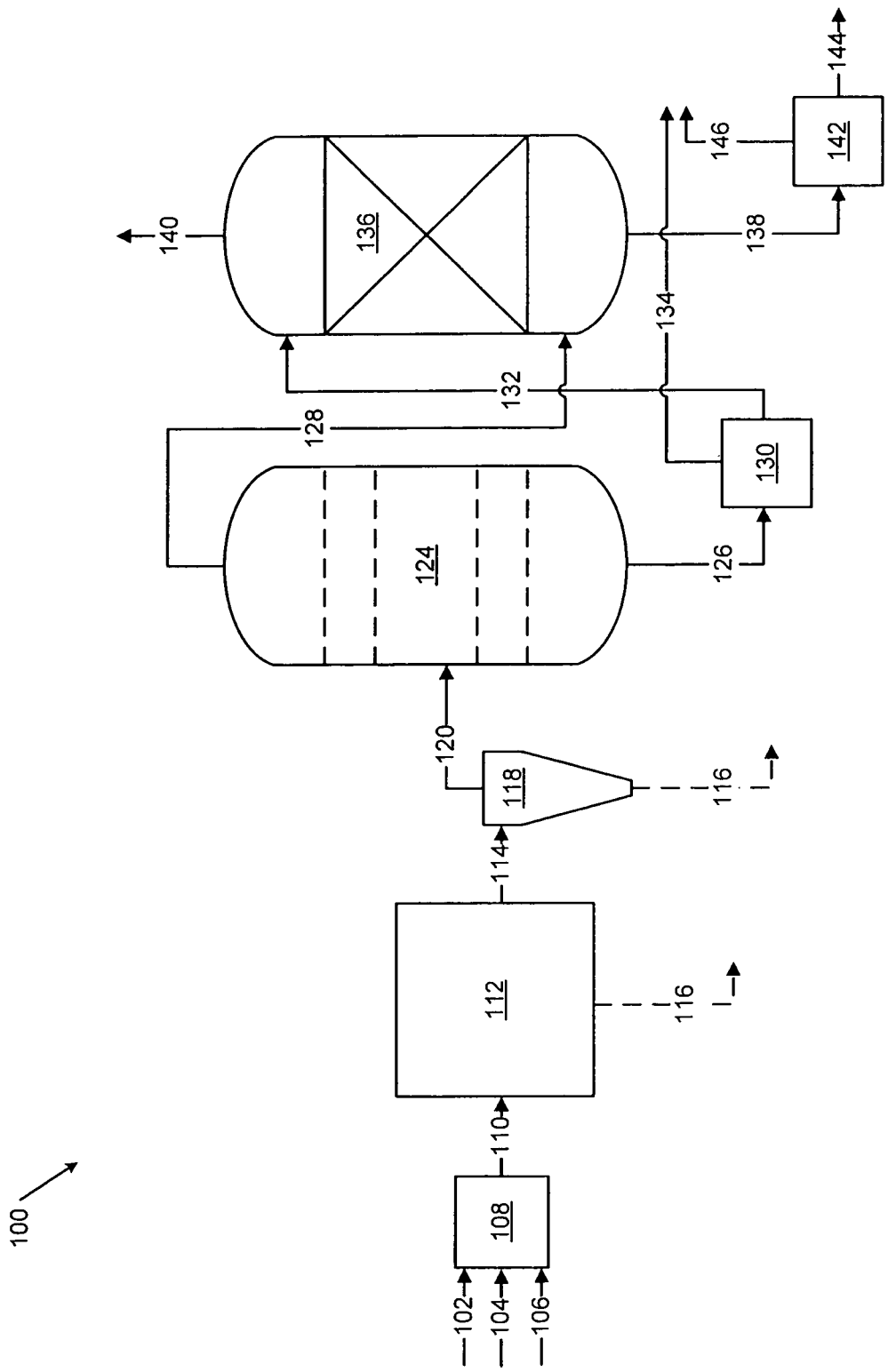

US 9,598,286 B2

METHODS AND SYSTEMS FOR FORMING AMMONIA AND SOLID CARBON PRODUCTS

PRIORITY CLAIM

This application claims the benefit of the filing date of U.S. Provisional Patent Application Ser. No. 61/671,464, filed Jul. 13, 2012, for "Methods and Systems for Forming Ammonia and Solid Carbon Products," the disclosure of which is hereby incorporated herein in its entirety by this reference.

FIELD

Embodiments of the disclosure relate to methods and systems for concurrently forming ammonia and solid carbon products from a carbon oxide, such as carbon monoxide or carbon dioxide, and a hydrogen-containing reducing agent, such as hydrogen or methane, and nitrogen in the presence of a catalyst.

BACKGROUND

U.S. Patent Publication No. 2012/0034150 A1, published Feb. 9, 2012, the disclosure of which is hereby incorporated herein in its entirety by this reference, discloses background information hereto.

Additional information is disclosed in the following documents, the disclosure of each of which is hereby incorporated herein in its entirety by this reference:

1. International Application No.—PCT/US2013/000072, filed Mar. 15, 2013, now WO 2013/158156 A1, published Oct. 24, 2013, for "Methods and Structures for Reducing Carbon Oxides with Non Ferrous Catalysts," which claims the benefit of U.S. Provisional Patent Application Ser. No. 61/624,702, filed Apr. 16, 2012, in the name of Dallas B. Noyes;
2. International Application No.—PCT/US2013/000076, filed Mar. 15, 2013, now WO 2013/158159 A1, published Oct. 24, 2013, for "Methods and Systems for Thermal Energy Recovery from Production of Solid Carbon Materials by Reducing Carbon Oxides," which claims the benefit of U.S. Provisional Patent Application Ser. No. 61/624,573, filed Apr. 16, 2012, in the name of Dallas B. Noyes;
3. International Application No.—PCT/US2013/000077, filed Mar. 15, 2013, now WO 2013/158160 A1, published Oct. 24, 2013, for "Methods for Producing Solid Carbon by Reducing Carbon Dioxide," which claims the benefit of U.S. Provisional Patent Application Ser. No. 61/624,723, filed Apr. 16, 2012, in the name of Dallas B. Noyes;
4. International Application No.—PCT/US2013/000073, filed Mar. 15, 2013, now WO 2013/15857 A1, published Oct. 24, 2013, for "Methods and Reactors for Producing Solid Carbon Nanotubes, Solid Carbon Clusters, and Forests," which claims the benefit of U.S. Provisional Patent Application Ser. No. 61/624,753, filed Apr. 16, 2012, in the name of Dallas B. Noyes;
5. International Application No.—PCT/US2013/000075, filed Mar. 15, 2013, now WO 2013/158158 A1, published Oct. 24, 2013, for "Methods for Treating an Offgas Containing Carbon Oxides," which claims the benefit of U.S. Provisional Patent Application Ser. No. 61/624,513, filed Apr. 16, 2012, in the name of Dallas B. Noyes;
6. International Application No.—PCT/US2013/000071, filed Mar. 15, 2013, now WO 2013/15855 A1, published Oct. 24, 2013, for "Methods for Using Metal Catalysts in Carbon Oxide Catalytic Converters," which claims the benefit of U.S. Provisional Patent Application Ser. No. 61/624,848, filed Apr. 16, 2012, in the name of Dallas B. Noyes;
7. International Application No.—PCT/US2013/00008, filed Mar. 15, 2013, now WO 2013/158161 A1, published Oct. 24, 2013, for "Methods and Systems for Capturing and Sequestering Carbon and for Reducing the Mass of Carbon Oxides in a Waste Gas Stream," which claims the benefit of U.S. Provisional Patent Application Ser. No. 61/624,462, filed Apr. 16, 2012, in the name of Dallas B. Noyes;
8. International Application No.—PCT/US2013/000079, filed Mar. 15, 2013, now WO 2013/162650 A1, published Oct. 31, 2013, for "Carbon Nanotubes Having a Bimodal Size Distribution," which claims the benefit of U.S. Provisional Patent Application Ser. No. 61/637,229, filed Apr. 23, 2012, in the name of Dallas B. Noyes.

Ammonia is an important chemical having many applications, such as in the production of fertilizers, cleaners, explosives, etc. Ammonia is directly or indirectly used in a variety of chemical processes to produce various nitrogen-containing compounds, such as amines, aramid fibers, and pharmaceuticals. The production of ammonia is therefore a major worldwide industry. Ammonia is commonly produced by the Haber-Bosch process.

In the Haber-Bosch process, ammonia is synthesized by the reaction of hydrogen and nitrogen in the presence of a catalyst, such as iron, according to Reaction 1:

$$3H_2(g) + N_2(g) \rightleftarrows 2NH_3(g) \qquad (1).$$

The rate of reaction of hydrogen and nitrogen in Reaction 1 is a function of the reaction conditions including the temperature, pressure, and presence of catalyst. Increasing the temperature increases the reaction rate, but also shifts the reaction equilibrium. The equilibrium constant $K_{eq}$, defined as the ratio of the product of the partial pressures of the product to the product of the partial pressures of the reactants, as shown in the equation $$K_{eq} = \frac{p_{NH_3}^2}{p_{N_2} p_{H_2}^3},$$

is also a function of temperature. However, because Reaction 1 consumes four moles of gas to produce two moles of ammonia gas, the equilibrium conversion to ammonia gas increases with increased pressure. That is, at a given temperature, the fraction of molecules of ammonia present at equilibrium is higher at relatively high pressure than at relatively low pressure. Conventional production of ammonia by the Haber-Bosch process generally involves temperatures between about 300° C. and about 550° C. and pressures between about 5 MPa and about 35 MPa. Conventional production of ammonia is described in, for example, G. Ertl, "Primary Steps in Catalytic Synthesis of Ammonia," *J. Vac. Sci. Technol.* A 1(2), p. 1247-53 (1983).

The conditions conventionally used to form ammonia require high-pressure reaction vessels, pipes, valves, and other equipment. Equipment and machinery capable of operating at high pressures have high capital costs because stronger materials (e.g., thicker walls, exotic materials, etc.)

are generally more expensive. Furthermore, heating and pressurizing reactants generally require heat exchangers, pumps, and compressors, such that energy consumption may play a significant role in production costs.

Hydrogen used in Reaction 1 may be from any source, but is conventionally formed from methane, coal, or another hydrocarbon. The preparation of the feed gases is typically a multi-step process including steam reforming, shift conversion, carbon dioxide removal, and methanation, with associated apparatus and operating expenses. For example, a common synthesis route is to form hydrogen from methane. In such a process, the methane is reformed typically in a steam reformer, wherein methane reacts with water in the presence of a nickel catalyst to produce hydrogen and carbon monoxide:

$$CH_4+H_2O \rightarrow CO+3H_2 \qquad (2),$$

which is referred to in the art as a "steam-reforming" reaction. Secondary reforming then takes place using oxygen to convert residual methane to carbon oxides, hydrogen, and water:

$$2CH_4+O_2 \rightarrow 2CO+4H_2 \qquad (3);$$

$$CH_4+2O_2 \rightarrow CO_2+2H_2O \qquad (4).$$

Carbon monoxide is then converted to carbon dioxide to form additional hydrogen:

$$CO+H_2O \rightarrow CO_2+H_2 \qquad (5),$$

which is referred to in the art as the "water-gas shift reaction." Carbon dioxide is removed from the mixed gases and is typically discharged to atmosphere. The gases are then passed through a methanator to convert residual carbon monoxide, a catalyst poison, to methane and water:

$$CO+3H_2 \rightarrow CH_4+H_2O \qquad (6).$$

The overall result of Reactions 2 through 6 is that methane and steam are converted to carbon dioxide and hydrogen. Conventional preparation of hydrogen from hydrocarbons, such as described for the example of methane, for use in the Haber-Bosch process may be performed in a series of reactors, and may require separation or other treatment of some components of gas streams to form a suitably pure hydrogen stream.

Ammonia production as outlined above results in significant releases of carbon dioxide to the atmosphere. Concerns with regard to anthropogenic greenhouse-gas emissions make such emissions undesirable. Thus, it would be advantageous to provide a method of forming ammonia that minimizes or eliminates carbon dioxide emissions.

Separation of carbon dioxide from exhaust gases, such as from combustion sources, process offgases, etc., is becoming a significant concern in mitigating anthropogenic greenhouse-gas emissions. Such streams typically include carbon dioxide in a mixture of other gases, particularly nitrogen (e.g., in combustion effluents) and often hydrogen (e.g., in synthesis gases). Separation of the carbon dioxide from other gases and the transport of the resulting carbon dioxide typically include liquefaction of the carbon dioxide, which is costly. Eliminating the need for the separation of carbon dioxide from nitrogen, carbon monoxide, methane, and hydrogen would be of significant benefit for many types of exhaust gases. Subsequently processing the gas mixture into valuable products, such as solid carbon and ammonia, could alleviate or eliminate some emissions of carbon dioxide. The conversion of carbon dioxide to solid carbon products may have value from the perspective of carbon capture and storage.

BRIEF SUMMARY

Methods of concurrently forming ammonia and solid carbon products include reacting a mixture of a carbon oxide, such as carbon monoxide, carbon dioxide or mixtures thereof, with nitrogen and a reducing agent, such as methane or hydrogen, in the presence of a catalyst to form a solid carbon product and a tail gas mixture containing water, ammonia, and unreacted gases. The solid carbon product is removed from the reactor or, if entrained in the tail gas mixture, is separated from the tail gas mixture. Water and ammonia are recovered from the tail gas mixture. The solid carbon product is in the tail gas mixture as elutriated particulates entrained in the tail gas stream when produced in, for example, a fluidized-bed reactor based production system. The solid carbon product may be removed from the reactor through other means such as with catalysts from the bottom of the reactor when produced in, for example, a shaft kiln based production system. For the purposes of this disclosure, the removal of the solid carbon product from the reactor by entrainment in the tail gas stream will be used as the illustrating example, without distracting from the generality of the method and with recognition that the solid carbon product need not be entrained in or removed from the tail gas stream.

Other methods for producing ammonia and solid carbon products include heating a first gas stream containing a mixture of at least one carbon oxide such as carbon monoxide or carbon dioxide and nitrogen to a predetermined reaction temperature to form a carbon oxide and nitrogen reaction gas; heating a second gas stream to the predetermined reaction temperature to form a reducing agent reaction gas; mixing the carbon oxide and nitrogen reaction gas with the reducing agent reaction gas; reacting nitrogen, the at least one carbon oxide, and the reducing agent reaction gas in the presence of a catalyst to form a solid carbon product and a tail gas mixture comprising steam, ammonia, and a residual gas mixture; separating at least a portion of the entrained solid carbon product from the tail gas mixture; and separating constituents of the tail gas mixture to form a solid carbon products stream, a water stream, an ammonia product stream, and a residual gas stream. Before the separation, the solid carbon product is in the tail gas mixture as entrained particulates. The first gas stream comprises at least one carbon oxide and nitrogen, and the second gas stream comprises a reducing agent.

Additional reactions between the solid carbon product and the ammonia may occur, resulting in the functionalization of the solid carbon product with ammonia.

In certain embodiments hereof, the partial pressure of water in the reaction is regulated by various means, including recycling and condensation of water, to influence, for example, the structure or other aspects of the composition of carbon products produced. The partial pressure of water appears to assist in obtaining certain desirable carbon allotropes.

In certain embodiments, a broad range of inexpensive and readily-available catalysts, including steel-based catalysts, are described, without the need for activation of the catalyst before it is used in a reaction. Iron alloys, including steel, may contain various allotropes of iron, including alpha-iron (austenite), gamma iron, and delta-iron. In some embodiments, reactions disclosed herein advantageously utilize an iron-based catalyst, wherein the iron is not in an alpha phase. In certain embodiments, a stainless steel containing iron primarily in the austenitic phase is used as a catalyst.

Catalysts, including an iron-based catalyst (e.g., steel, steel wool), may be used without a need for an additional solid support. In certain embodiments, reactions disclosed herein proceed without the need for a ceramic or metallic support for the catalyst. Omitting a solid support may simplify the setup of the reactor and reduce costs.

A system for forming ammonia and solid carbon products from a gaseous source containing carbon oxides and nitrogen includes mixing means, reactor means, and solid separation means. The mixing means is operable for mixing the gaseous source with a reducing agent. The reactor means includes a suitable reactor in which at least a portion of the gaseous source reacts with the reducing agent in the presence of a catalyst to produce a solid carbon product and a tail gas mixture containing ammonia. The solid separation means is operable for separating the entrained solid carbon product from the tail gas mixture.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawing, in which:

FIG. 1 is a block diagram depicting a system for forming ammonia and solid carbon products, and illustrates some embodiments of the method.

DETAILED DESCRIPTION

This disclosure includes methods and systems for forming ammonia and solid carbon products by reacting carbon oxides and nitrogen with a reducing gas in the presence of a suitable catalyst. Solid carbon, water, and ammonia may each be valuable products. Carbon oxides and nitrogen from any industrial process or derived from the atmosphere may be processed as disclosed herein. Hydrogen or hydrogen-containing reducing agents (e.g., hydrogen, methane, gaseous alkanes, alcohols, etc.), such as are commonly available, may be used as the reducing agent. Systems for carrying out the methods disclosed herein include mixers, reactors, separators, condensers, and other chemical processing equipment.

The formation of the solid carbon products (e.g., graphite, graphene, carbon black, fibrous carbon, buckminsterfullerenes, single-wall carbon nanotubes (CNTs), multi-wall CNTs, carbon platelets, nanodiamond, etc.) concurrently with the formation of ammonia appears to result in at least some degree of amine functionalization of the solid carbon products, which may have further benefit in several applications.

As used herein, the term "carbon oxide" means and includes carbon monoxide, carbon dioxide, and any combination of carbon monoxide, carbon dioxide, and one or more other materials (e.g., reducing agent or nitrogen). As used herein, the term "reducing agent" means and includes hydrogen or hydrogen-containing reducing agents, such as methane, gaseous alkanes, alcohols, etc., and any combination thereof. Reducing agents may optionally include one or more other materials (e.g., nitrogen or common constituents of well gases, syngas, etc.).

As used herein, the term "catalyst" means and includes a material formulated to promote one or more reactions described herein. A portion of a catalyst may be removed from a surrounding portion of the catalyst during the reaction and contained in or adhered to a solid carbon product. Thus, some of the catalyst may be physically removed during the reaction, and the catalyst may need to be continually replenished. The portion of the catalyst may not therefore be considered a catalyst in the classical sense, but is nonetheless referred to herein and in the art as a "catalyst," if the reaction is not believed to alter chemical bonds of the material forming the catalyst. Particularly useful catalysts include iron, nickel, cobalt, etc., and alloys and mixtures thereof, as described herein and well-known to promote Haber-Bosch and Bosch reaction chemistries.

FIG. 1 depicts a process flow diagram of one embodiment of a system 100 for forming ammonia and solid carbon products and a method that may be performed using the system 100. A source gas stream 102 containing carbon oxide is mixed with nitrogen 104 and a reducing agent 106 in a mixer 108. The source gas stream 102 includes carbon oxide and, optionally, other gases. The source gas stream 102 may be an offgas from an industrial process, such as a gas formed during the combustion of hydrocarbons (e.g., in the operation of a generator, a heater, a motor, etc.), a well gas, or another natural or industrial source of carbon oxide. The nitrogen 104 may be a separate gas mixed with the source gas stream 102, or may optionally be a part of the source gas stream 102. For example, effluent gas from a combustion-based power plant generally includes carbon oxide and nitrogen, and may therefore constitute both a portion or all of the source gas stream 102 and a portion or all of the nitrogen 104. The reducing agent 106 may be a separate gas mixed with the source gas stream 102, or may optionally be a part of the source gas stream 102. For example, effluent gas from a chemical process may be in the form of synthesis gas containing hydrogen, and may therefore constitute both a portion or all of the source gas stream 102 and a portion or all of the reducing agent 106.

The reducing agent 106 may be formulated to react with carbon oxides to form solid carbon products. The reducing agent 106 may include, for example, hydrogen, methane, another hydrocarbon, an alcohol, natural gas, a synthesis gas etc., or any combination thereof. In some embodiments, the reducing agent 106 includes additional reaction gases to promote the catalytic conversion of the carbon-containing components of the source gas stream 102. The mixture of the source gas stream 102, the nitrogen 104, and the reducing agent 106 forms a process gas stream 110, which is heated to a predetermined temperature and which enters a catalytic converter 112. In some embodiments, the source gas stream 102, the nitrogen 104, and the reducing agent 106 mix after entering the catalytic converter 112, such that the mixer 108 may be omitted. Alternatively, the mixer 108 may mix two of the materials, and the remaining material may mix in the catalytic converter 112. For example, the source gas stream 102 and the nitrogen 104 may mix in the mixer 108, and the reducing agent 106 may mix with the source gas stream 102 and the nitrogen 104 in the catalytic converter 112.

The heating of the process gas stream 110 may be accomplished by direct combustion, wherein air or oxygen is used to combust a portion of the reducing agent 106. Such combustion results in heat and forms all or a portion of the source gas stream 102 and of the nitrogen 104. In such cases, the mixer 108 could be a suitable vessel wherein the combustion occurs and the gases are mixed, forming a heated process gas stream 110.

Gases react in the presence of a catalyst in the catalytic converter 112 to form an intermediate mixture 114 and a solid carbon product 116. For example, hydrogen reacts with carbon dioxide in the Bosch reaction:

$$CO_2 + 2H_2 \leftrightarrow C_{(s)} + 2H_2O \qquad (7).$$

Furthermore, reaction of the reducing agent 106 with nitrogen and carbon oxides forms solid carbon, water (as vapor), and ammonia. For example, carbon dioxide, nitrogen, and hydrogen are believed to react as shown in Reaction 8:

$$CO_2 + N_2 + 5H_2 \leftrightarrow C_{(s)} + 2H_2O + 2NH_3 \qquad (8).$$

Carbon monoxide, nitrogen, and hydrogen are believed to react as shown in Reaction 9:

$$CO + N_2 + 4H_2 \leftrightarrow C_{(s)} + H_2O + 2NH_3 \qquad (9).$$

Though the mechanisms are not currently known, the products form in concurrent reactions in the catalytic converter 112. The catalytic converter 112 may consist of multiple reactors in parallel or series as may be desired for a given application. The reactions may thus occur substantially simultaneously in different reactors or zones of a single reactor, such as by feeding an output from one reactor to another reactor. That is, the process gas stream 110 may enter a first reactor, wherein one or more reactions occur. The products and/or unreacted reactants may enter a second reactor, wherein other reactions occur. The reactions may occur simultaneously on different portions of catalytic material or as a gas-phase reaction (e.g., in the reduction of carbon dioxide to carbon monoxide).

The reducing agent 106 may include methane or any another hydrocarbon. Methane is believed to react with carbon dioxide and carbon monoxide as shown in Reactions 10 and 11:

$$CO_2 + 2N_2 + 4CH_4 \leftrightarrow 5C_{(s)} + 2H_2O + 4NH_3 \qquad (10);$$

$$2CO + 2N_2 + 4CH_4 \leftrightarrow 6C_{(s)} + 2H_2O + 4NH_3 \qquad (11).$$

Any of Reactions 7 through 11 may occur with stoichiometric amounts of reactants, or with excess of some reactants. Any of Reactions 7 through 11 may include multiple reaction steps. For example, the reaction of carbon dioxide, nitrogen, and hydrogen in Reaction 8 is believed to proceed as a series of discrete reactions. The carbon dioxide and a portion of the hydrogen may first react to form carbon monoxide and water, as shown in Reaction 12:

$$CO_2 + H_2 \leftrightarrow CO + H_2O \qquad (12).$$

Carbon monoxide may then react with an iron catalyst to form an oxide, as shown in Reaction 13:

$$CO + Fe \leftrightarrow C_{(s)} + FeO \qquad (13).$$

The catalyst oxide may be immediately reduced by hydrogen, as shown in Reaction 14:

$$FeO + H_2 \leftrightarrow Fe + H_2O \qquad (14).$$

Hydrogen may concurrently react with nitrogen on the surface of the catalyst, as shown in Reaction 1, above.

As a further example, the reaction of carbon dioxide, nitrogen and hydrogen in Reaction 8 may proceed as a series of discrete reactions including the oxidation of methane to produce hydrogen, as shown in Reaction 15:

$$CO_2 + CH_4 \leftrightarrow 2CO + 2H_2 \qquad (15).$$

A concurrent two-step process may then proceed, including the reduction of carbon dioxide by hydrogen as shown in Reaction 12, followed by a steam-reforming reaction of methane and water, as shown in Reaction 2, above. The carbon monoxide may be reduced, as shown in Reactions 13 and 14, concurrent with reaction of nitrogen and hydrogen, as shown in Reaction 1. Regardless of the exact mechanism, all of the reactions may proceed essentially concurrently in the catalytic converter 112 or variants thereof as previously discussed.

Reactant concentrations may be selected to be stoichiometric or near-stoichiometric. That is, the process gas stream 110 may include concentrations of reactants (carbon oxide, nitrogen, and reducing agent) that, if fully reacted, would be entirely or almost entirely consumed. For example, the process gas stream 110 may include about 14.3 mol % carbon dioxide, about 14.3 mol % nitrogen, and about 71.4 mol % hydrogen. This mixture, if fully reacted according to Reaction 8, would consume approximately all of the gases in the process gas stream 110. Other mixtures may be selected to react according to particular reactions, such as Reactions 9 through 11. The composition of the process gas stream 110 may not be stoichiometric. For example, the molar ratio of carbon oxides to nitrogen in the process gas stream 110 may be from about 2:1 to about 1:2, from about 5:1 to about 1:5, or even from about 10:1 to about 1:10. In general, mixtures of reducing agent 106 including both hydrogen and methane may be beneficial. The proportion of reducing agent 106 in the process gas stream 110 determines the type (allotropes and morphologies) of solid carbon product produced. For example, a carbon-rich process gas stream 110 tends to form coke, graphitic, and amorphous solid carbon products. A hydrogen-rich process gas stream 110 tends to form CNTs, carbon nanofibers, and related filamentous structures. The composition of the process gas stream 110 may be selected based on economics, process controls, environmental regulations, etc. In some embodiments, the process gas stream 110 includes inert gases that do not react in the catalytic converter 112, such as argon. In such cases, vent streams may control the accumulation of inert gases in the process gas streams if the system recirculates significant portions of the gas.

Some reactions (e.g., any of Reactions 7 through 15) may be promoted or accelerated by suitable catalysts. That is, reaction kinetics favorable to the formation of desired products may be established through a catalyst. For example, some metals from Groups 2 through 15 of the periodic table, such as from groups 5 through 10, (e.g., nickel, molybdenum, chromium, cobalt, tungsten, iron, manganese, ruthenium, platinum, iridium, etc.) actinides, lanthanides, alloys thereof, and combinations thereof may accelerate the reaction rates of Reactions 7 through 15. For example, catalysts include iron, nickel, cobalt, molybdenum, tungsten, chromium, and alloys thereof. Note that the periodic table may have various group numbering systems. As used herein, group 2 is the group including Be, group 3 is the group including Sc, group 4 is the group including Ti, group 5 is the group including V, group 6 is the group including Cr, group 7 is the group including Mn, group 8 is the group including Fe, group 9 is the group including Co, group 10 is the group including Ni, group 11 is the group including Cu, group 12 is the group including Zn, group 13 is the group including B, group 14 is the group including C, and group 15 is the group including N. In some embodiments, commercially available metals are used without special preparation. Some suitable catalysts are described in U.S. Patent Application Publication No. 2012/0034150 A1. Some catalysts facilitate operations at lower temperatures and pressures.

The ammonia synthesis reaction, Reaction 1, appears to proceed at a higher rate when combined with the production of solid carbon. Without being bound to a particular theory, it is believed that in the production of the solid carbon, nanoparticles of the catalyst (which may be referred to as "nanocatalyst") are formed and embedded in the solid carbon product. These nanoparticles typically form greater than 0.4% by weight of the solid carbon product. These nanoparticles may remain catalytically active in their solid carbon mounts. Without being bound to a particular theory, it is believed that the catalyst is active primarily in the formation of the CNTs with the mounted nanocatalyst, and that the CNTs with the mounted nanocatalyst are primarily active in the formation of the ammonia. There is some evidence that pure CNTs are effective catalysts for many different types of reactions. It is believed that the combination of CNTs together with nanocatalyst mounted in the growth tips of the CNTs is an effective catalyst for the ammonia synthesis and that both the CNTs and the nanocatalyst contribute to the catalysis of the associated reactions. The formation of the CNTs with nanocatalyst may be performed in-situ as a part of the reactions.

304 stainless steel appears to catalyze the formation of CNTs under a wide range of temperatures, pressures, and gas compositions. However, the rate of formation of CNTs on 304 stainless steel appears to be relatively low, such that 304 stainless steel may be used effectively as a construction material for process equipment, with minimal deposition on surfaces thereof in normal operations. 316L stainless steel, in contrast, appears to catalyze the formation of solid carbon at significantly higher rates than 304 stainless steel, but may also form various morphologies of carbon. Thus, 316L stainless steel may be used as a catalyst to achieve high reaction rates, but particular reaction conditions may be maintained to control product morphology. Catalysts may be selected to include Cr, such as in amounts of about 22% or less by weight. For example, 316L stainless steel contains from about 16% to about 18.5% Cr by weight. Catalysts may also be selected to include Ni, such as in amounts of about 8% or more by weight. For example, 316L stainless steel contains from about 10% to about 14% Ni by weight. Catalysts of these types of steel have iron in an austenitic phase, in contrast to alpha-phase iron used as a catalyst in conventional processes. Given the good results observed with 316L stainless steel, the Ni and/or Cr may have a synergistic effect with Fe.

Oxidation and subsequent reduction of the catalyst surface alter the grain structure and grain boundaries. Without being bound by any particular theory, oxidation appears to alter the surface of the metal catalyst in the oxidized areas. Subsequent reduction may result in further alteration of the catalyst surface. Thus, the grain size and grain boundary of the catalyst may be controlled by oxidizing and reducing the catalyst surface and by controlling the exposure time of the catalyst surface to the reducing gas and the oxidizing gas. The oxidation and/or reduction temperatures may be in the range from about 500° C. to about 1,200° C., from about 600° C. to about 1,000° C., or from about 700° C. to about 900° C. The resulting grain size may range from about 0.1 µm to about 500 µm, from about 0.2 µm to about 100 µm, from about 0.5 µm to about 10 µm, or from about 1.0 µm to about 2.0 µm. In some embodiments, the catalyst may be an oxidized metal (e.g., rusted steel) that is reduced before or during a reaction forming solid carbon. Without being bound to any partcular theory, it is believed that removal of oxides leaves voids or irregularities in the surface of the catalyst material, and increases the overall surface area of the catalyst material.

Catalysts may be in the form of nanoparticles or in the form of solid materials including, for example, steel or other bulk metals or as domains or grains and grain boundaries within a solid material. Catalysts may be selected to have a grain size related to a characteristic dimension of a desired diameter of the solid carbon product (e.g., a CNT diameter). Examples of suitable catalysts include elements of Groups 5 through 10 of the periodic table, actinides, lanthanides, alloys thereof, and combinations thereof. Catalyst may be deposited in the catalytic converter 112 in the form of solids, beads, granules, powders, or aerosols. Because a portion of the bulk catalyst is removed with every CNT, the catalyst in the catalytic converter may be replenished from time to time, based on the reactor properties (e.g., volume) and reaction conditions (e.g., temperature, pressure, etc.). Catalyst powder may be formed in or near the reaction zone by injecting an aerosol solution such that upon evaporation of a carrier solvent, a selected particle size distribution results. Alternatively, powdered or particulate catalyst may be entrained in a gas delivered to the reactor, such as the source gas stream 102, the nitrogen 104, or the reducing agent 106. By selecting the catalyst and the reaction conditions, the process may be tuned to produce selected morphologies of solid carbon product. Catalysts and formation thereof are described in U.S. Pat. No. 8,679,444, issued Mar. 25, 2014. In some embodiments, the catalyst may be formed over a substrate or support, such as an inert oxide that does not participate in the reactions. However, the substrate is not necessary; in other embodiments, the catalyst material is an unsupported material, such as a bulk metal or particles of metal not connected to another material (e.g., loose particles, shavings, or shot, such as may be used in a fluidized-bed reactor).

In some embodiments, the catalytic converter 112 includes one or more aerosol reactors in which a catalyst is preformed and selected for a specific size distribution, mixed into a liquid or carrier gas solution, and then sprayed into the reactor (e.g., via electrospray). Solid carbon forms on the catalyst, water and ammonia form on the catalyst or carbon-nanotube mounted nanocatalyst, and gas flow transports the products out of the catalytic converter 112. In another embodiment, the catalytic converter 112 includes one or more fluidized-bed reactors into which catalyst particles or catalyst-coated particles are introduced, and in which solid carbon is grown on the surface of the particles. The solid carbon is either elutriated within the catalytic converter 112 and carried out of the catalytic converter 112 entrained in the reaction gases, or the catalyst particles are harvested and the solid carbon is removed from the surface.

The catalytic converter 112 may include one or more batch reactors in which the catalyst is either a fixed solid surface (e.g., the catalyst may be a steel plate) or is mounted on a fixed solid surface (e.g., catalyst nanoparticles deposited on an inert substrate). In such embodiments, solid carbon is grown on the catalyst, and the catalyst and solid carbon product 116 are periodically removed from the catalytic converter 112. Alternatively, the catalytic converter 112 may include continuous reactors, wherein the solid carbon product 116 is removed from the catalyst as the solid carbon is formed. In some embodiments, a solid catalyst or catalyst mounted on a solid substrate is moved through a flowing gas stream, the resulting solid carbon product 116 is harvested, and the solid surface is renewed and reintroduced to the catalytic converter 112. The solid substrate may be the catalyst material (e.g., a solid piece of a chromium-, molybdenum-, cobalt-, iron-, or nickel-containing alloy or superalloy) or a surface on which the catalyst is mounted.

In one embodiment, the catalytic converter 112 includes a fluidized-bed reactor designed to retain the catalyst while allowing the solid carbon product 116 to be entrained in the flow of the intermediate mixture 114 and to be lofted out of the reaction zone upon reaching a desired size. The shape of the reactor and the gas flow rates influence the residence time of the elutriates and the corresponding size of the solid carbon product 116 (such as the length of CNTs).

Reaction conditions of the catalytic converter 112 (e.g., time, temperature, pressure, partial pressure of reactants, catalyst properties, etc.) may be optimized to produce a selected type, morphology, purity, homogeneity, etc., of the solid carbon product 116. For example, conditions may be selected to promote the formation of CNTs and ammonia. In some embodiments, the solid carbon product 116 includes allotropes of carbon or morphologies thereof, including graphite, pyrolytic graphite, graphene, carbon black, fibrous carbon, buckminsterfullerenes, single-wall CNTs, or multi-wall CNTs. The catalytic converter 112 may operate at any pressure including pressures of from about 100 kPa (1.0 bar) to about 30,000 kPa (300 bar), such as from about 200 kPa (2.0 bar) to about 1000 kPa (10 bar). In general, higher pressures correspond to faster reaction rates and a shift in equilibrium to the desired products. Pressures such as those currently used in common practice of the Haber-Bosch reaction are entirely practical. The catalytic converter 112 may operate at temperatures of from about 550° C. to about 1200° C., such as from about 650° C. to about 800° C.

Though the catalytic converter 112 is shown in FIG. 1 as a single unit, the catalytic converter 112 may include two or more reaction vessels. For example, one reaction vessel may operate at conditions favorable to a first step of a reaction, and another reaction vessel may operate at conditions favorable to a second step of a reaction. The catalytic converter 112 may include any number of reaction vessels or regions in which materials may react, depending on the particular reactions expected to occur. Each reaction vessel may be configured and operated to optimize a reaction step. For example, reaction vessels may operate at different temperatures or pressures from one another.

As one example, the catalytic converter 112 may include two reactors. The first reactor may be configured and operated to optimize formation of ammonia, and the second reactor may be configured and operated to optimize formation of solid carbon products. Alternatively, the first reactor may be configured and operated to optimize formation of solid carbon products, and the second reactor may be configured and operated to optimize formation of ammonia. Appropriate separation equipment, compressors, heaters, coolers, etc., may be used between reactors.

The methods disclosed herein may include a variety of separation technologies. Once the carbon oxide and reducing gases have reacted in the catalytic converter 112, the solid carbon product 116 is removed from the catalytic converter 112. The solid carbon product 116 may be separated from the intermediate mixture 114 in the catalytic converter 112 or associated apparatus as, for example, when the catalytic converter 112 is in the form of a shaft kiln, or may leave the catalytic converter 112 mixed with the intermediate mixture 114 as, for example, when the catalytic converter 112 is in the form of a fluidized-bed reactor. That is, the solid carbon product 116 may be a component of the intermediate mixture 114 (e.g., may be entrained as solid particles in the intermediate mixture 114). The intermediate mixture 114 includes those gases that remain in the catalytic converter 112 after the reaction, the product gases including water and ammonia gases, and may optionally include a portion of the solid carbon product 116. For example, the intermediate mixture 114 includes unreacted portions of the source gas stream 102, the nitrogen 104, and/or the reducing agent 106, as well as products formed in the catalytic converter 112. Products formed in the catalytic converter 112 include, for example, water (e.g., steam) and ammonia.

The intermediate mixture 114, which includes solid carbon product 116 and tail gas, enters a solids separator 118 configured to separate fluid 120 (i.e., gases and/or liquids) from the solid carbon product 116 or other solids. The solids separator 118 is illustrated in FIG. 1 as a cyclone separator, but may include a multiple-stage cyclone, an electrostatic precipitator, a bag house, a filter, or any other separation means. The solids separator 118 may include one or more separation apparatuses operated in series or in parallel. Techniques for separation of solids from the fluid 120 depend on the type of catalytic converter 112 used and the expected composition of the intermediate mixture 114.

The solids separator 118 is operable to separate the solid carbon product 116 (if the intermediate mixture 114 includes part or all of the solid carbon product 116 formed in the catalytic converter 112) or other solids from the fluid 120. The solid carbon product 116 or a portion thereof may also be separated from the intermediate mixture 114 within the catalytic converter 112, rather than in a distinct separation apparatus. The solid carbon product 116 may be collected and separated from the fluid 120 by elutriation, centrifugation, electrostatic precipitation, filtration, or any other method. The solid carbon product 116 removed from the catalytic converter 112 or the solids separator 118 is sold as a commercial product, used in the production of another product, stored for long-term sequestration, etc.

A lock hopper system may be used to remove the solid carbon product 116 from the catalytic converter 112 or from the solids separator 118. In such embodiments, the portion of the process gas stream 110 or the intermediate mixture 112 mixed with the solid carbon product 116 can be purged prior to discharge. The lock hopper system typically also includes a means for cooling the solid carbon product 116 to a temperature below the oxidation temperature of the product in air prior to discharging.

Heat may be recovered from the intermediate mixture 114 or the fluid 120, such as by passing the intermediate mixture 114 and the process gas stream 110 through one or more heat exchangers. Counterflowing some or all of intermediate mixture 114 and the process gas stream 110 with any or all of streams including the source gas stream 102, nitrogen 104, and/or reducing agent 106 with the process gas stream 110 is an effective way to recover a portion of the process heat and help bring the reaction gas steams to the reaction temperature. Any gas or liquid streams (e.g., the source gas stream 102, the nitrogen 104, the reducing agent 106, or the fluid 120) may be processed as known in the art for overall energy optimization. The intermediate mixture 114 may be maintained above the dew point of the water vapor in the intermediate mixture 114 prior to separation of the solid carbon product 116 from the fluid 120 to limit or prevent the condensation of water in or on the solid carbon product 116.

The solid carbon product 116 typically passes through a lock drum or other separation means to control the release of the reaction gases and to purge the solid carbon product 116 of reaction gases prior to removal of the solid carbon product 116 from the system 100. Other suitable means may be used for removing the solid carbon product 116 from the catalytic converter 112 or the solids separator 118 that conserve reaction gases and minimize worker and environmental exposure to the reaction gases.

The fluid 120 may be gaseous, liquid, or a combination of gases and liquids, though most commonly it will be gaseous because the temperature will be maintained high enough to prevent the water and ammonia products from condensing. The fluid 120 may be treated, such as by heating, cooling, pressurizing, condensing, etc., before entering a liquids separator 124, illustrated in FIG. 1 as a distillation column. The liquids separator 124 may be any apparatus or combination thereof configured to separate liquids 126 from gases 128. For example, the liquids separator 124 may be a fractionating column, a steam-distillation vessel, a vacuum-distillation vessel, a flash evaporator, etc. The liquids separator 124 may include other features or apparatuses, such as condensers, reboilers, compressors, plates, trays, packing material, etc.

The liquids 126 leaving the liquids separator 124 include water and any other material condensable from the fluid 120. For example, the liquids 126 may include water and dissolved ammonia. In some embodiments, the liquids 126 may be saturated with ammonia upon leaving the liquids separator 124. The gases 128 include any material not condensable from the fluid 120, and may also include some condensable materials. For example, the gases 128 may include unreacted carbon oxide, unreacted nitrogen, unreacted reducing agent, water vapor, gaseous ammonia, and/or other gases.

The liquids 126 optionally enter a vessel 130 operable to remove ammonia 134 from water 132. For example, the vessel 130 may include means for changing the temperature and pressure of the liquids 126 (e.g., a heat exchanger, a flash tank, etc.). The mass flow of the ammonia 134 leaving the vessel 130 may be at least about 50%, at least about 75%, at least about 90%, at least about 95%, or even at least about 99% of the mass flow of ammonia in the liquids 126 entering the vessel 130. In some embodiments, the water 132 is substantially free of ammonia, such that the water 132 may be disposed of or used in other operations.

In some embodiments, the water 132 leaving the vessel 130 is used to scrub additional ammonia from the gases 128 leaving the liquids separator 124. For example, the water 132 and the gases 128 each enter a scrubber 136 operable to transfer ammonia from the gases 128 to the water 132. The scrubber 136 may include a spray nozzle, a packed tower, an aspirator, etc. Liquids 138 and gases 140 leave the scrubber 136. The gases 140 have a lower concentration of ammonia than the gases 128 leaving the liquids separator 124. For example, the gases 140 may have a concentration of ammonia of less than about 10%, less than about 1%, or even less than about 0.1% of the concentration of ammonia in the gases 128. The gases 140 may be substantially free of ammonia, such that the gases 140 may be vented to the atmosphere, reused in another operation, or recycled within the process. The gases 140 may have a higher concentration of water vapor than the gases 128 entering the scrubber 136. Water vapor may optionally be condensed from the gases 140, if desired.

The gases 140 may optionally be recycled in total or in part and mixed with the source gas stream 102 in mixer 108 or as a gas stream entering the catalytic converter 112. The gases 140 may be dried, preheated, and otherwise treated prior to recycle. The gases 140 may optionally be mixed with any of the other gas streams including the nitrogen 104, the reducing agent 106, or the process gas stream 110.

The liquids 138 optionally enter a vessel 142 operable to remove ammonia 146 from water 144. The vessel 142 may be similar in design and operation to the vessel 130. For example, the vessel 142 may include means for changing the temperature and pressure of the liquids 138 (e.g., a heat exchanger, a flash tank, etc.). The mass flow of the ammonia 146 leaving the vessel 142 may be at least about 50%, at least about 75%, at least about 90%, at least about 95%, or even at least about 99% of the mass flow of ammonia in the liquids 138 entering the vessel 142. In some embodiments, the water 144 may be substantially free of ammonia, such that the water 144 may be disposed of or used in other operations.

The ammonia 134, 146 formed in the system 100 is generally removed in gaseous form (i.e., as anhydrous ammonia, $NH_3$), and may be liquefied for storage and transport. The ammonia 134, 146 may be processed by conventional methods, stored, transported, or sold. For example, the ammonia 134, 146 may be further processed to form anhydrous ammonia for storage and transport in pressurized tanks. Optionally, aqueous ammonia may be removed via the liquids 126, 138. In such embodiments, the vessels 130, 142 may be eliminated. Make-up water may be added to the system 100 (e.g., to the scrubber 136) if aqueous ammonia is removed via the liquids 126, 138.

The reaction conditions, including the temperature and pressure in the reaction zone, the residence time of the reaction gases, and the grain size, grain boundary, and chemical composition of the catalyst may be controlled to obtain solid carbon products of the desired characteristics. The feed gas mixture and reaction product are typically recycled through the reaction zone and passed through a condenser with each cycle to remove excess water and to control the partial pressure of the water vapor in the reaction gas mixture. The partial pressure of water is one factor that appears to affect the type and character (e.g., morphology) of solid carbon formed, as well as the kinetics of carbon formation.

Carbon activity ($A_c$) can be used as an indicator of whether solid carbon will form under particular reaction conditions (e.g., temperature, pressure, reactants, concentrations). Without being bound to any particular theory, it is believed that carbon activity is the key metric for determining which allotrope of solid carbon is formed. Higher carbon activity tends to result in the formation of CNTs, lower carbon activity tends to result in the formation of graphitic forms.

Carbon activity for a reaction forming solid carbon from gaseous reactants can be defined as the reaction equilibrium constant times the partial pressure of gaseous products, divided by the partial pressure of reactants. For example, in the reaction, $CO_{(g)} + H_{2(g)} \rightleftarrows C_{(s)} + H_2O_{(g)}$, with a reaction equilibrium constant of K, the carbon activity $A_c$ is defined as $K \cdot (P_{CO} \cdot P_{H2}/P_{H2O})$. Thus, $A_c$ is directly proportional to the partial pressures of CO and $H_2$, and inversely proportional to the partial pressure of $H_2O$. Higher $P_{H2O}$ tends to inhibit CNT formation. The carbon activity of this reaction may also be expressed in terms of mole fractions and total pressure: $A_c = K \cdot P_T (Y_{CO} \cdot Y_{H2}/Y_{H2O})$, where $P_T$ is the total pressure and Y is the mole fraction of a species. Carbon activity generally varies with temperature because reaction equilibrium constants vary generally with temperature. Carbon activity also varies with total pressure for reactions in which a different number of moles of gas are produced than are consumed. Mixtures of solid carbon allotropes and morphologies thereof can be achieved by varying the catalyst and the carbon activity of the reaction gases in the reactor.

EXAMPLE

Carbon dioxide, nitrogen, and methane gas are mixed in a ratio of 1:2:4 inside a tube furnace lined with a ceramic material, maintained at about 680° C. and 4.1 MPa, and containing steel wool therein. The methane gas reacts with the carbon dioxide and the nitrogen in the presence of the steel wool to form CNTs and a reaction gas mixture of water and ammonia. The reaction gas mixture enters a condenser operating at about 20° C. and 100 kPa to condense liquid water from the reaction gas mixture. The condensate from the condenser enters a flash tank, where the pressure is decreased to about 10 kPa to remove dissolved ammonia from the condensate. The dried reaction gas mixture from the condenser and the ammonia from the flash tank enter a scrubber. Water is sprayed in the scrubber to dissolve ammonia gas into an aqueous form. The aqueous ammonia is collected and removed from the system.

After the process has proceeded for a period of time, flow of gas is stopped, the furnace, and condenser, and scrubber are cooled to room temperature, and the system is purged with an inert gas. The steel wool is removed from the second tube furnace, and the CNTs are physically removed from the steel wool. Any remaining metal on the CNTs may be removed, if desired, by washing with acid.

Although the foregoing description contains many specifics, these are not to be construed as limiting the scope of the present disclosure, but merely as providing certain embodiments. Similarly, other embodiments of the invention may be devised that do not depart from the scope of the present disclosure. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A method of concurrently forming ammonia and a solid carbon product, the method comprising:
    reacting at least one carbon oxide comprising carbon dioxide and carbon monoxide with nitrogen and at least one reducing agent in the presence of a catalyst to form solid carbon entrained in a tail gas mixture comprising water, ammonia, and unreacted gases;
    separating the entrained solid carbon from the tail gas mixture;
    recovering water from the tail gas mixture; and
    recovering ammonia from the tail gas mixture.

2. The method of claim 1, wherein reacting at least one carbon oxide, nitrogen, and at least one reducing agent in the presence of a catalyst comprises forming a plurality of carbon nanotubes.

3. The method of claim 2, wherein forming a plurality of carbon nanotubes comprises functionalizing surfaces of the plurality of carbon nanotubes with at least one material selected from the group consisting of nitrogen and amines.

4. The method of claim 1, wherein recovering ammonia from the tail gas mixture comprises:
    exposing the tail gas mixture to an aqueous liquid;
    absorbing at least a portion of the ammonia in the aqueous liquid; and
    separating the tail gas mixture from the aqueous liquid.

5. The method of claim 1, wherein reacting at least one carbon oxide and at least one reducing agent in the presence of a catalyst comprises forming water as steam, the method further comprising:
    condensing at least a portion of the steam to form liquid water;
    absorbing at least a portion of the ammonia in the liquid water; and
    separating the absorbed ammonia from the liquid water.

6. The method of claim 1, further comprising forming a reaction gas mixture comprising the at least one carbon oxide, the nitrogen, and the at least one reducing agent, wherein a molar ratio of the at least one carbon oxide to the nitrogen is in a range from about 10:1 to about 1:10.

7. The method of claim 1, further comprising mixing at least a portion of the tail gas mixture with the at least one carbon oxide, nitrogen, and the at least one reducing agent after separating the solid carbon product and recovering the water and the ammonia.

8. The method of claim 1, wherein reacting at least one carbon oxide, nitrogen, and at least one reducing agent in the presence of a catalyst comprises reacting a carbon oxide comprising primarily carbon dioxide with the nitrogen and the at least one reducing agent in the presence of the catalyst.

9. The method of claim 1, wherein reacting at least one carbon oxide, nitrogen, and at least one reducing agent in the presence of a catalyst comprises reacting a carbon oxide comprising primarily carbon monoxide with the nitrogen and the at least one reducing agent in the presence of the catalyst.

10. The method of claim 1, wherein reacting at least one carbon oxide, nitrogen, and at least one reducing agent in the presence of a catalyst comprises reacting a synthesis gas in the presence of the catalyst.

11. The method of claim 1, wherein reacting at least one carbon oxide, nitrogen, and at least one reducing agent in the presence of a catalyst comprises reacting the at least one carbon oxide, the nitrogen, and the at least one reducing agent in the presence of a catalyst comprising iron.

12. The method of claim 1, wherein reacting at least one carbon oxide, nitrogen, and at least one reducing agent in the presence of a catalyst comprises reacting the at least one carbon oxide, the nitrogen, and a reducing agent comprising hydrogen in the presence of the catalyst.

13. The method of claim 1, wherein reacting at least one carbon oxide, nitrogen, and at least one reducing agent in the presence of a catalyst comprises reacting the at least one carbon oxide, the nitrogen, and the at least one reducing agent in the presence of a catalyst at a temperature of between about 400° C. and about 1,000° C.

14. A method of concurrently forming ammonia and a solid carbon product, the method comprising:
    reacting at least one carbon oxide, nitrogen, and a reducing agent comprising a hydrocarbon in the presence of a catalyst to form solid carbon entrained in a tail gas mixture comprising water, ammonia, and unreacted gases;
    separating the entrained solid carbon from the tail gas mixture;
    recovering water from the tail gas mixture; and
    recovering ammonia from the tail gas mixture.

15. The method of claim 14, wherein reacting at least one carbon oxide, nitrogen, and at least one reducing agent in the presence of a catalyst comprises reacting the at least one carbon oxide, the nitrogen, and a reducing agent comprising methane in the presence of the catalyst.

16. A method of concurrently forming ammonia and a solid carbon product, the method comprising:
    wherein reacting at least one carbon oxide, nitrogen, and at least one reducing agent in the presence of a catalyst comprising a plurality of nanoparticles, wherein each nanoparticle is mounted on a carbon nanofiber to form solid carbon entrained in a tail gas mixture comprising water, ammonia, and unreacted gases;
separating the entrained solid carbon from the tail gas mixture;
recovering water from the tail gas mixture; and
recovering ammonia from the tail gas mixture.

* * * * *

UNITED STATES PATENT AND TRADEMARK OFFICE
CERTIFICATE OF CORRECTION

PATENT NO. : 9,598,286 B2  Page 1 of 1
APPLICATION NO. : 14/414364
DATED : March 21, 2017
INVENTOR(S) : Dallas B. Noyes It is certified that error appears in the above-identified patent and that said Letters Patent is hereby corrected as shown below:

In the Specification
Column 3, Line 45, change "to fonu a suitably" to --to form a suitably--

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*